UNITED STATES PATENT OFFICE.

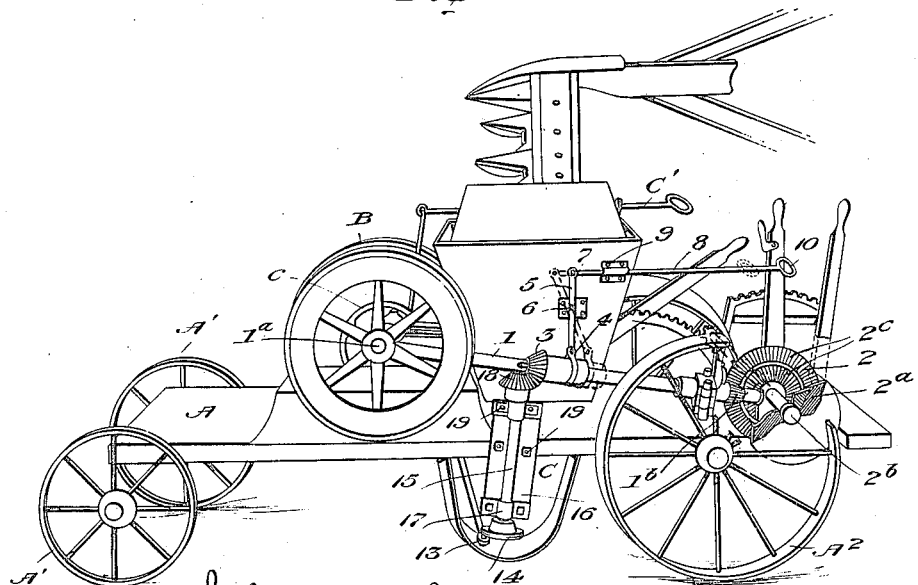
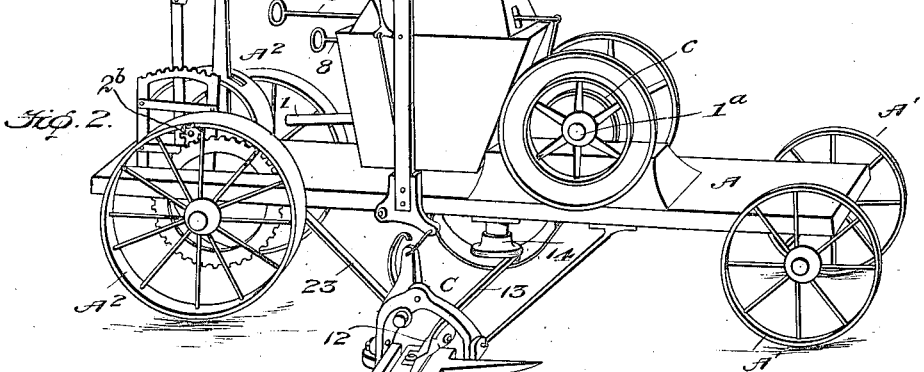
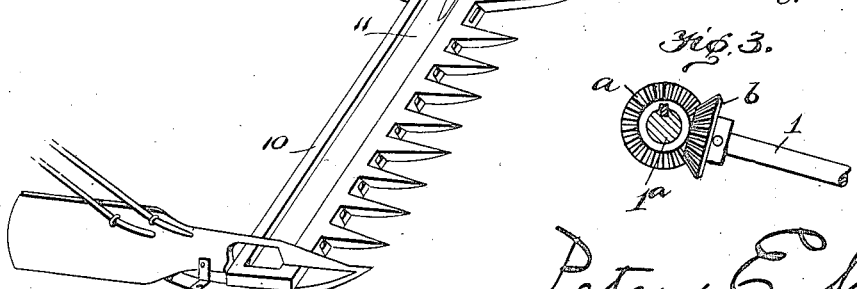

PETER E. SHIRK, OF BLUE BALL, PENNSYLVANIA.

COMBINED MOTOR-VEHICLE AND MOWER.

1,154,662.

Specification of Letters Patent.  Patented Sept. 28, 1915.

Application filed August 29, 1910. Serial No. 579,462.

*To all whom it may concern:*

Be it known that I, PETER E. SHIRK, of Blue Ball, county of Lancaster, and State of Pennsylvania, have invented a new and useful Improvement in Combined Motor-Vehicles and Mowers, of which the following is a specification.

This invention relates to a combined traction engine and mower.

The object of the invention, in one aspect, is to combine a mower with a traction engine, and to provide connecting mechanism therebetween, whereby the power generated to propel said engine may be utilized to operate said mower.

A further object of the invention is to provide mechanism whereby the mower receives its power directly from the main drive-shaft of the traction engine by means of a shaft-and-pitman connection directly connected to said main shaft.

With these and other objects in view, the invention consists in the novel combination and arrangement of parts hereinafter more fully described and claimed.

In the accompanying drawings: Figure 1 is a view in perspective of a motor vehicle with my improvement embodied therein, the mower being, in this instance, shown in its inoperative position, the gear-casing being removed, and a portion of the gearing cut away more clearly to disclose the parts comprising the speed-regulating mechanism; Fig. 2 is a similar view of the opposite side of the machine, the mower being shown in its operative position; and Fig. 3 is a fragmentary view, partly in section, of the driving gears and their shafts.

In these drawings, A designates a motor-supporting base sustained by front wheels A' and drive-wheels A². Upon the base is supported a motor B for driving a primary shaft 1 which connects with and is operated by means of a crank-shaft 1ª, which carries a gear $a$ meshing with a gear $b$ on the shaft 1, as shown in Fig. 3. At the opposite end of said drive-shaft 1 is a cone-gear 1ᵇ slidably disposed thereon. Two opposed gears 2 and 2ª are mounted upon a shaft 2ᵇ, each of said gears being provided with a plurality of rings of gear-teeth 2ᶜ with one or another of which rings said cone-gear is adapted to engage, according to the speed at which the vehicle is to be propelled. Said gears, being mounted on the shaft 2ᵇ, are adapted to propel the vehicle forwardly or rearwardly, according to which of said gears is connected to said cone 1ᵇ. In this application, I do not make claim to the details of this reversing mechanism, since the same constitutes the subject-matter of my application, Serial No. 572,886.

Intermediate of the ends of the shaft 1 is a gear 3 keyed to rotate with it, but free to move longitudinally thereon. A collar 4 loosely encircles this gear and carries, at its upper portion, a lever 5 pivoted at 6 and connected at 7 to a rod 8. This rod is loosely held in a guide 9 and carries a handle 10 at one end. It will readily be seen that, by moving the rod 9 to the position shown in dotted lines (Fig. 1), the lever 5, acting on collar 4, will draw the gear 3 back to the position shown in dotted lines and out of engagement with the mower mechanism C, now to be described.

As a means for controlling the speed of the motor B, I provide a control-lever C', the rear end of which is conveniently disposed to be grasped by the operator. This control-lever operates a brake $c$ connecting with the motor in the usual manner.

The mower mechanism C is adapted to be supported at the side of the vehicle, and comprises a mower bar 10 which carries a cutter blade 11 attached, by a loose split-coupling 12, to a pitman 13. This pitman extends underneath the engine and is eccentrically connected to a pitman disk 14 on the lower end of a vertical, secondary shaft 15, on the opposite side of said engine. It will be observed that the secondary shaft 15 is disposed vertically with relation to the primary shaft 1, and is, therefore, mounted at an angle thereto. The shaft 15 is rotatably supported on the plate 16 by a bearing 17 and carries at its upper end a gear 18 which is adapted to mesh with the cone-gear 3 on the shaft 1. This plate may be attached to the vehicle in any convenient manner, and is here shown as secured to the base A by bolts 19.

It will be understood that, when the vehicle has been started, the drive-shaft 1, being driven by the motor B, will drive the vehicle. The operator may then throw the mower mechanism into operation by operating the control-member 8. If it is desired to retard the speed of the vehicle and mower, without stopping the vehicle entirely, he would operate the control-lever C'. If the operator desires to stop the operation of the mower mechanism without stopping the vehicle or changing its speed, he would operate the control lever 8.

From the foregoing, it will be seen that independent controlling means are provided, whereby the mower mechanism may be thrown into or out of operation independently of the vehicle propelling or speed-changing mechanisms.

While I have herein described the details of my invention, it is to be understood that I do not restrict my invention to such details except in so far as the same may be specified in the claims.

Having thus described my invention, what I claim and desire to secure by Letters-Patent is:

1. In a harvesting machine, the combination with a wheel-supported frame, a motor, traction wheels, a transmission shaft for connecting said motor and traction wheels, and clutch mechanism for connecting and disconnecting said transmission shaft and said traction wheels, of a cutter-drive shaft disposed in substantially vertical position between said motor and said traction wheels; a driving connecting-member between said cutter-drive shaft and said transmission shaft; means for connecting said driving member with said transmission shaft to be driven thereby; a pitman-disk mounted on the opposite end of said cutter-drive shaft; cutter mechanism disposed on said frame; and an operating member connecting said pitman-disk and said cutter mechanism.

2. In a harvesting machine, the combination with a wheel-supported frame, a motor, traction wheels, a transmission shaft mounted on one side of said frame and connecting said motor and traction wheels, a two-speed drive gear, a reversing gear, and clutch mechanism coacting with said transmission shaft and said traction wheels, of a cutter drive shaft mounted substantially vertically on said frame and in alinement with said transmission shaft; a driving member slidably mounted on said transmission shaft; a driving member mounted on the end of said cutter drive shaft; clutch mechanism for connecting and disconnecting said members; a pitman-disk mounted on the end of said cutter drive shaft opposite said driving member; cutter mechanism mounted on said frame in juxtaposition to said pitman-disk; and a member connecting said pitman-disk and said cutter mechanism whereby the latter may be raised out of operative position without disconnecting said cutter mechanism from said pitman-disk.

3. In a harvesting machine, the combination with a wheel-supported frame, a motor, traction wheels, a transmission shaft mounted on one side of said frame and connecting said motor and traction wheels, a two-speed driving gear, a reversing gear, and clutch mechanism coacting with said transmission shaft and said traction wheels, of a supporting member vertically mounted on one side of said frame in alinement with said transmission shaft; a cutter drive shaft mounted vertically in bearings on said support; a beveled gear mounted on one end of said cutter drive shaft; a beveled gear slidably mounted on said transmission shaft between said motor and said traction wheels; a clutch member for connecting and disconnecting said gears; a pitman-disk mounted horizontally on the opposite end of said cutter drive shaft; supporting members mounted on said frame opposite said cutter drive shaft support; cutter drive mechanism carried by said supporting members; means mounted on said frame for raising and lowering said cutter mechanism; and a rod connecting said pitman-disk and said cutter mechanism whereby the latter may be raised out of operative position without disconnecting said pitman-disk and said cutter mechanism.

In testimony whereof I hereunto set my hand this fourth day of August, 1910, in the presence of two attesting witnesses.

PETER E. SHIRK.

Witnesses:
ELI HESS,
J. F. BRUBAKER.